(12) United States Patent
Gong et al.

(10) Patent No.: US 11,793,706 B2
(45) Date of Patent: Oct. 24, 2023

(54) POWER-ASSIST CONTROL METHOD AND DEVICE FOR INTELLIGENT ROLLATOR, INTELLIGENT ROLLATOR, AND CONTROLLER

(71) Applicant: ZHEJIANG YIHENGYUE MEDICAL TECHNOLOGY CO., LTD., Taizhou (CN)

(72) Inventors: Mao Gong, Taizhou (CN); Jianfeng Lu, Taizhou (CN)

(73) Assignee: ZHEJIANG YIHENGYUE MEDICAL TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/086,448

(22) Filed: Dec. 21, 2022

(65) Prior Publication Data

US 2023/0119433 A1    Apr. 20, 2023

Related U.S. Application Data

(63) Continuation-in-part of application No. PCT/CN2021/105452, filed on Jul. 9, 2021.

(30) Foreign Application Priority Data

Jul. 1, 2021    (CN) .......................... 202110749161.0

(51) Int. Cl.
    *A61H 3/04*    (2006.01)
    *A61G 5/04*    (2013.01)
    *A61H 3/00*    (2006.01)

(52) U.S. Cl.
    CPC ................. *A61H 3/04* (2013.01); *A61G 5/04* (2013.01); *A61G 2203/44* (2013.01);
    (Continued)

(58) Field of Classification Search
    None
    See application file for complete search history.

(56) References Cited

U.S. PATENT DOCUMENTS

9,968,507 B2\*    5/2018    Rabin ................. B60L 15/2036
10,908,045 B2\*    2/2021    Coulter ................. B60W 10/08
(Continued)

FOREIGN PATENT DOCUMENTS

CA    2290145 A1    5/2001
CN    101305951 A    11/2008
(Continued)

OTHER PUBLICATIONS

Ma, Xiaozhen et al. "Electric Wheelchair Motion Control System Design", Micromotors Dec. 30, 2009, 62 pages.
(Continued)

*Primary Examiner* — Daniel L Greene
(74) *Attorney, Agent, or Firm* — MUNCY, GEISSLER, OLDS & LOWE, P.C.

(57) ABSTRACT

An intelligent rollator has a vehicle body, a seat provided in the vehicle body for a person to sit or place items on, and front and rear wheels provided at the bottom of the wheels, driven by motors. A power-assist control method includes the following steps: obtaining the load weight of the vehicle body; and entering a first power-assist compensation mode to compensate the torque output of the motor according to a first power-assist compensation threshold, when the load weight is greater than a set threshold. The first power-assist compensation threshold is direct proportional to at least one of the following parameters: the load weight of the intelligent rollator, and the moving speed of the intelligent rollator.

12 Claims, 2 Drawing Sheets

(52) U.S. Cl.
CPC .. *A61H 2003/002* (2013.01); *A61H 2003/043* (2013.01); *A61H 2201/5061* (2013.01)

(56) References Cited

U.S. PATENT DOCUMENTS

| | | | | |
|---|---|---|---|---|
| 2011/0172886 | A1* | 7/2011 | Taira | A61G 5/04 |
| | | | | 701/49 |
| 2017/0354564 | A1 | 12/2017 | Diraug et al. | |
| 2018/0271739 | A1* | 9/2018 | Watabe | A61H 3/04 |
| 2021/0121343 | A1* | 4/2021 | Lonner | B25J 13/086 |
| 2022/0218555 | A1* | 7/2022 | Raja | B60L 15/2018 |

FOREIGN PATENT DOCUMENTS

| | | | |
|---|---|---|---|
| CN | 103171614 | A | 6/2013 |
| CN | 106214434 | A | 12/2016 |
| CN | 106553728 | A | 4/2017 |
| CN | 107184324 | A | 9/2017 |
| CN | 107485543 | A | 12/2017 |
| CN | 107600296 | A | 1/2018 |
| CN | 108125752 | A | 6/2018 |
| CN | 207693802 | U | 8/2018 |
| CN | 109199717 | A | 1/2019 |
| CN | 109199802 | A | 1/2019 |
| CN | 109986567 | A | 7/2019 |
| CN | 110037865 | A | 7/2019 |
| CN | 111317622 | A | 6/2020 |
| CN | 111469967 | A | 7/2020 |
| CN | 113552822 | B | 7/2022 |
| DE | 10 2016 210212 | A1 | 12/2017 |
| EP | 30000456 | A1 | 3/2016 |
| EP | 3205322 | A1 | 8/2017 |
| JP | 2006-326159 | A | 12/2006 |
| JP | 6199380 | B2 | 9/2017 |
| JP | 2018-61819 | A | 4/2018 |
| WO | WO-2014/188726 | A1 | 11/2014 |

OTHER PUBLICATIONS

Peng, Yuri et al., "Self-Propelled Push-Type Dual-Control Wheel Chair", China Science and Technology Information, Dec. 30, 2016, 2 pages.

Zhong, Xiaoyou et al., "Research and Design of Intelligent Control Wheelchair Based on Python", Mechanics, Mar. 15, 2020, pp. 77-80, vol. No. 3, Issue 47.

Ma, Jinping et al., "Design and Experiment of Walking Assistance Wheelchair for Semi-Disabled Elderly", Mechanical Transmission, Feb. 22, 2021, pp. 140-147 and 170, vol. 45, Issue No. 2.

* cited by examiner

POWER-ASSIST CONTROL METHOD AND DEVICE FOR INTELLIGENT ROLLATOR, INTELLIGENT ROLLATOR, AND CONTROLLER

CROSS-REFERENCE TO RELATED APPLICATIONS

This application is a Continuation-In-Part application of International Application PCT/CN2021/105452, with an international filing date of Jul. 9, 2021, which claims priority to Chinese Patent Application No. 202110749161.0, having a filing date Jul. 1, 2021, the contents of all of which are hereby incorporated by reference.

FIELD OF TECHNOLOGY

The present application relates to the technical field of intelligent walking aids, in particular to a power-assist control method and device for an intelligent rollator, an intelligent rollator, and a controller.

BACKGROUND

With the progress of the times, there are a large number of intelligent wheeled walkers or rollators for the elderly, such as electric wheelchairs and shopping strollers.

Wheelchairs are generally divided into two categories, one is the electric wheelchair that needs to be pushed by caregivers, and the other is the electric wheelchair that can be controlled by the rider. Manual wheelchair users are generally the ones who have lost some of their mobility with their hands and legs, while electric wheelchair users are elderly and disabled people with normal hands and partial loss of mobility with their legs, who can control the wheelchair with a rocker.

Shopping strollers generally have the functions of loading goods and assisting walking. They are widely used in developed countries such as Europe, America, Japan and South Korea etc. The users are the elderly or people having certain mobility with their legs. Shopping strollers require users to push for moving.

The application scenarios and control methods of wheelchairs and shopping strollers are quite different. At present, there is not yet a product that can combine the functions and advantages of the two kinds of products.

SUMMARY

Therefore an object of the present application is to provide a power-assist control method and device for an intelligent rollator, an intelligent rollator, and a controller, which makes it possible to automatically determine whether the intelligent rollator is used to seat a person or place objects according to the load weight of the intelligent rollator, so as to automatically select a first power-assist compensation mode (wheelchair mode) or a second power-assist compensation mode (shopping stroller mode), and automatically adjust the power-assist compensation threshold according to the difference of the two power-assist compensation modes, making the intelligent rollator of the present application more intelligent and capable of achieving the intention of the user of the intelligent rollator under any road conditions for smooth walking.

According to a first aspect of embodiments of the present application, there is provided a power-assist control method for an intelligent rollator having a vehicle body, a seat provided in the vehicle body for a person to sit or place items on, and front and rear wheels provided at the bottom of the vehicle body, driven by motors. The method includes the following steps:

obtaining the load weight of the vehicle body; and entering a first power-assist compensation mode to compensate the torque output of the motor according to a first power-assist compensation threshold, when the load weight is greater than a set threshold, wherein the first power-assist compensation threshold is direct proportional to at least one of the following parameters: the load weight of the vehicle body, and the moving speed of the intelligent rollator.

Optionally, obtaining the load weight of the vehicle body includes:

obtaining the preset load weight corresponding to the manually selected gear position;

and/or obtaining the load weight of the vehicle body automatically, including:

obtaining at least one of the following parameters under the condition of the set speed:

The acceleration time of the intelligent rollator, the output power of the motor of the intelligent rollator and the current of the motor; and obtaining the pre-set load weight corresponding to the at least one of the parameters as the current load weight of the vehicle body.

Optionally, the method further includes below step:

entering a second power-assist compensation mode to compensate the torque output of the motor according to a second power-assist compensation threshold, when the load weight is less than a set threshold, wherein the second power-assist compensation threshold is obtained according to a set gear.

Optionally, determination of the first compensation threshold includes the following steps:

determining a fixed compensation value, wherein the fixed compensation value includes a speed compensation value, a weight compensation value and a gradient compensation value;

determining a specific compensation value, wherein the specific compensation value includes an acceleration/deceleration compensation value and/or a turn compensation value; and obtaining the first compensation threshold based on the fixed compensation value and the specific compensation value.

Optionally, the steps of determining the speed compensation value include:

obtaining the current moving speed of the intelligent rollator; and obtaining the power compensation coefficient currently required according to the moving speed through looking up a table, and obtaining the speed compensation value according to the moving speed and the power compensation coefficient, wherein the speed compensation value is direct proportional to the moving speed and the power compensation coefficient.

Optionally, the steps of determining the gradient compensation value include:

determining the gradient compensation value, when the intelligent rollator going uphill, the greater the gradient, the greater the gradient compensation value; and determining the gradient compensation value, when the intelligent rollator going downhill, the greater the gradient, the smaller the gradient compensation value which is negative.

Optionally, the steps for determining the gradient compensation value further include:

determining that the intelligent rollator is moving from flat to uphill and increasing gradually the gradient compensation value, when the vertical angle of the vehicle body is greater than a first set threshold and the angular velocity of the vehicle body in the vertical direction is greater than a second set threshold; and determining that the intelligent rollator is moving from downhill to flat and increasing gradually the gradient compensation value which is a negative value, when the vertical angle of the vehicle body is less than a third set threshold which is negative and the angular velocity of the vehicle body in the vertical direction is greater than a set fourth threshold.

Optionally, the steps of determining the acceleration/deceleration compensation value include:

obtaining the acceleration or deceleration of the forward movement of the intelligent rollator, wherein the acceleration indicates that the intelligent rollator is in an acceleration stage, and the deceleration indicates that the intelligent rollator is in a deceleration stage;

determining that the acceleration/deceleration compensation value is a positive value and is direct proportional to the acceleration, when the intelligent rollator is in an acceleration stage; and determining that the acceleration/deceleration compensation value is a negative value and is direct proportional to the deceleration, when the intelligent rollator is in a deceleration stage.

Optionally, the front wheel or the rear wheel includes a left wheel and a right wheel which are controlled by different motors respectively, and the turn compensation value includes a left-wheel turn compensation value and a right-wheel turn compensation value, wherein the steps of determining the turn compensation value includes:

increasing the left-wheel turn compensation value and/or decreasing the right-wheel turn compensation value, when the intelligent rollator makes a right turn; and increasing the right-wheel turn compensation value and/or decreasing the left-wheel turn compensation value, when the intelligent rollator makes a left turn. Optionally, determining the turn compensation value further includes:

increasing the left wheel turn compensation value and/or decreasing the right wheel turn compensation value in direct proportion to the turn angle of the intelligent rollator, when the intelligent rollator turns to the right; and increasing the right wheel turn compensation value and/or decreasing the left wheel turn compensation value in direct proportion to the turn angle of the intelligent rollator, when the intelligent rollator turns to the left. Optionally, determining the turn compensation value further includes:

obtaining the moving speeds of the left wheel and the right wheel respectively; and triggering a turn determination of the intelligent rollator when the difference between the moving speeds of the left wheel and the right wheel exceeds a set differential speed threshold.

According to a second aspect of embodiments of the present application, there is provided a power-assist control device for an intelligent rollator having a vehicle body, a seat provided in the vehicle body for a person to sit or place items on, and front and rear wheels provided at the bottom of the vehicle body, driven by motors. The device includes:

a load weight acquisition module for obtaining the load weight of the vehicle body; and a first power-assist compensation mode entry module for entering a first power-assist compensation mode to compensate the torque output of the motor according to a first power-assist compensation threshold, when the load weight is greater than a set threshold, wherein the first power-assist compensation threshold is direct proportional to at least one of the following parameters: the load weight of the vehicle body, and the moving speed of the intelligent rollator.

According to a third aspect of embodiments of the present application, there is provided an intelligent rollator, which includes:

at least one memory and at least one processor;

one or more programs stored in the memory, wherein the one or more programs are executed by the at least one processor to implement the steps of a power-assist control method for an intelligent rollator according to the first aspect of embodiments of the present application.

According to a forth aspect of embodiments of the present application, there is provided a controller, which includes:

at least one memory and at least one processor;

one or more programs stored in the memory, wherein the one or more programs are executed by the at least one processor to implement the steps of a power-assist control method for an intelligent rollator according to the first aspect of embodiments of the present application.

The present application can automatically determine whether an intelligent rollator is used to seat a person or place objects according to the load weight of the intelligent rollator, so as to automatically select a first power-assist compensation mode (wheelchair mode) or a second power-assist compensation mode (shopping stroller mode), and automatically adjust the power-assist compensation threshold according to the difference of the two power-assist compensation modes, making the intelligent rollator of the present application more intelligent. In addition, in the first power-assist compensation mode, the gradient compensation, the speed compensation, the acceleration/deceleration compensation and the turn compensation are applied to the intelligent rollator, to realize the intended smooth walking of the user in any road conditions.

In order to illustrate the embodiments of the present application or the technical solutions in the prior art more clearly, below is a brief introduction of the accompanying drawings required for the description of the embodiments of the present application. It is evident that the accompanying drawings in the following description are only some embodiments of the present application. It will be appreciated by persons skilled in the art that other drawings can be obtained based on these drawings without any creative effort.

BRIEF DESCRIPTION

Designations: 100—intelligent rollator; 101—seat; 102—driven wheel; 1031—first rear wheel; 1032—second rear wheel; 104—horizontal armrest; 105—intelligent front control device; 106—first horizontal handle; 107—second horizontal handle; 108—intelligent rear control device.

DETAILED DESCRIPTION

In order to make the object, technical scheme and advantages of this application more clear, the embodiments of the present application will be described in further detail below with reference to the accompanying figures.

It will be appreciated that the described embodiments are only a part of the embodiments of the present application, rather than all the embodiments. Based on the embodiments described in the present application, persons of ordinary skill in the art can obtain all other embodiments without creative work, which are all within the protection scope of the embodiments of the present application.

The terminology used herein is for the purpose of describing particular embodiments only and is not intended to be limiting of the application. As used herein, the singular forms "a," "an," and "the" are intended to include the plural forms as well as the singular forms, unless the context clearly indicates otherwise. It will be further appreciated, the term "and/or" includes any and all combinations of one or more of the associated listed items.

Where the following description refers to the figures, like designations denote like members in different figure unless otherwise indicated. The implementations described in the illustrative embodiments below are not intended to represent all implementations consistent with this application. Rather, they are merely examples of apparatus and methods consistent with some aspects of the present application, as recited in the appended claims. In the description of this application, it will be appreciated that the terms "first", "second", "third", etc. are only used to distinguish similar objects, and are not necessarily used to describe a specific order or sequence, nor as indicating or implying relative importance. For those of ordinary skill in the art, the specific meanings of the above terms in this application can be understood according to specific situations.

Also, in the description of the present application, unless otherwise specified, "a plurality" means two or more. "And/or", which describes the relationship between related objects means that there can be three kinds of relationships, for example, A and/or B, which can mean that A exists alone, A and B exist at the same time, and B exists alone. The character "/" generally indicates that the related objects are an "or" relationship.

Figure 1:
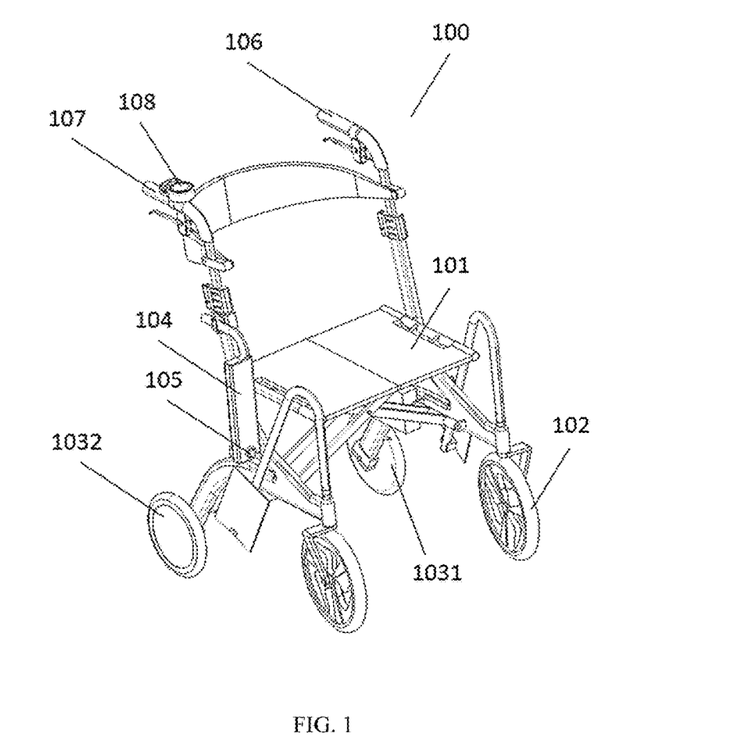
FIG. 1 is a schematic structural view of an intelligent rollator according to some embodiment of the present application.

An intelligent rollator described in this application embodiment can specifically be an electric wheelchair, a shopping stroller, a cart, etc. The intelligent rollator has front and rear wheels, and the rear/front wheels are driven by an electric motor, as shown in FIG. 1. As an example of a multifunctional walking aid, the intelligent rollator can be used as an electric wheelchair, a shopping stroller or a cart to carry items.

As shown in FIG. 1, the intelligent rollator 100 includes a vehicle body configured with a seat 101 for a person to sit or place items on, a front wheel, i.e., a driven wheel 102 at the front end of the vehicle body without power output, and a first rear wheel 1031 and a second rear wheel 1032 at the rear end of the vehicle body, wherein the first rear wheel 1031 and the second rear wheel 1032 are each driven by a different motor respectively. In some other embodiments, the first rear wheel 1031 and the second rear wheel 1032 may be driven by the same motor.

Preferably, the intelligent rollator 100 is configured with a front control unit used by a rider and a rear control unit used by a walker. Specifically, the vehicle body is configured with a horizontal armrest 104 (in a stowed position in FIG. 1), and the front end of the armrest 104 is configured with an intelligent front control device 105. Preferably, the intelligent front control device 105 is configured with a rocker that can be swung 360° horizontally, as well as a plurality of buttons and displays, etc., for the operation of the intelligent rollator.

The rear side of the vehicle body is further configured with a first horizontal handle 106 and a second horizontal handle 107 for hand-holding, and the second horizontal handle 107 is provided with an intelligent rear control device 108. Preferably, the intelligent rear control device 108 consists of an LCD screen, a constant speed finger rest, a sign sensing module, buttons, a posture sensing device, an intelligent rear control bracket and an intelligent rear control unit. The buttons includes an on/off button, a direction switching button, a power assist level switching button, the LCD screen displays speed, gear, remaining power and a multi-function display, wherein the constant speed finger rest can control the intelligent rollator to run at a set gear speed at a constant speed during touch, and the intelligent rear control unit is fixed to the front of the second horizontal handle by the intelligent rear control bracket.

In this embodiment, the intelligent front control device 105 is a Hall control system, and the user can control the rollator 360° through the Hall control system to achieve forward, backward, left and right turn, etc. to realize walking assistance.

A traditional intelligent rollator includes a normal mode and a constant speed assist mode. The different speed gears in the constant speed assist mode can be set by the intelligent front control device 105 or the intelligent rear control device 106. When a certain speed gear is selected, the intelligent rollator will move evenly in the constant speed assist mode to assist walking.

In some cases, the traditional intelligent rollator can automatically enter the constant speed assist mode according to some preset determination modes, or it can be manually selected to enter the constant speed assist mode, for example, by touching the constant speed finger rest of the intelligent rear control device 108.

The operating principle of the above constant speed assist mode is that, according to the preset speed, the current speed is collected, and the torque output of the rear wheel motor is controlled through feedback so that the current speed is equal to the preset speed.

However, this control method requires the user to continuously walk at the speed corresponding to the set gear, and the user cannot change the moving speed unless the gear is constantly adjusted. In addition, users cannot adjust according to road conditions, especially when the intelligent rollator is used as a wheelchair, due to the heavy load, the user will be overwhelmed when facing with different road conditions.

Regarding to above-mentioned problem, in embodiments of the present application, based on a traditional intelligent rollator, embodiments of the present application provide an automatic power-assist compensation method for an intelligent rollator. The automatic power-assist compensation method may be a dedicated automatic power-assist compensation mode, which can be implemented by the intelligent front control device 105 or the intelligent rear control device 108 in FIG. 1. In some embodiments, the automatic power-assist compensation mode can also be applied to any intelligent walker with front wheels and rear wheels (i.e. any rollators), wherein the front wheels or the rear wheels can be electric wheels. In embodiments of the present application, the rear wheels are electric wheels as an example.

In some embodiments, when the user pushes the intelligent rollator forward at a speed exceeding a set value, the automatic power-assist compensation mode is automatically entered to compensate power to the motor; when the speed is lower than the set value, the automatic power-assist compensation mode is exited.

Figure 2:
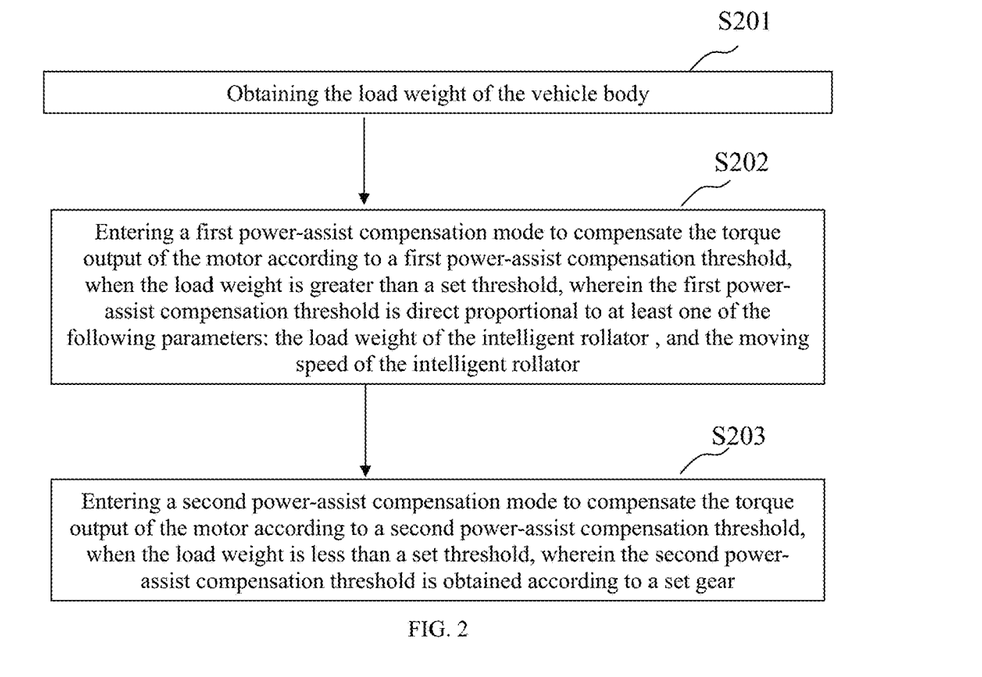
FIG. 2 is s a flow diagram of a power-assist control method for an intelligent rollator according to some embodiment of the present application.

Specifically, in the embodiment as shown in FIG. 2, the automatic power-assist compensation mode carries out the steps of the control method for an intelligent rollator as follows:

S201: Obtaining the load weight of the vehicle body; and

S202: Entering a first power-assist compensation mode to compensate the torque output of the motor according to a first power-assist compensation threshold, when the load weight is greater than a set threshold, wherein the first power-assist compensation threshold is direct proportional to at least one of the following parameters: the load weight of the vehicle body, and the moving speed of the intelligent rollator.

In some embodiment, the following step is further included:

S203: Entering a second power-assist compensation mode to compensate the torque output of the motor according to a second power-assist compensation threshold, when the load weight is less than a set threshold, wherein the second power-assist compensation threshold is obtained according to a set gear.

The above-mentioned load weight refers to the weight applied to the seat 101 as shown in FIG. 1, which may be the pressure generated by the person seated or the item placed on the seat 101. The set threshold is a preset weight value, which can be 20 KG.

The load weight is used to intelligently determine whether the current use of the intelligent rollator is in a first power-assist compensation mode (wheelchair mode) or a second power-assist compensation mode (shopping stroller mode).

For the shopping stroller mode with a light load weight, for example, when the load weight is less than 20 KG, there is no need to further determine the load weight, and a user can select different gears through the control panel to distinguish different use levels via setting different use level load values for different power compensation values accordingly, or the torque output of the motor is compensated according to the moving speed of the intelligent rollator.

For the wheelchair mode with a heavy load weight, for example, when the load weight is greater than 20 KG, the torque output of the motor can be compensated according to the first power-assist compensation threshold direct proportional to the load weight or moving speed.

In another embodiment, the weight of a shopping stroller includes that of the motor, the battery, the control system and the vehicle body itself, which in total is much heavier than that of a manual shopping cart. This is equivalent to load an empty shopping stroller with a heavy weight. In this case, the weight threshold can be set to zero, and the first power compensation mode is entered.

The power-assist control method for an intelligent rollator according to embodiments of the present application can automatically determine whether the intelligent rollator is used to seat a person or place objects according to the load weight of the intelligent rollator, so as to automatically select a first power-assist compensation mode (wheelchair mode) or a second power-assist compensation mode (shopping stroller mode), and automatically adjust the power-assist compensation threshold according to the difference of the two power-assist compensation modes, making the intelligent rollator of the present application more intelligent and automatically adjustable according to the user's walking speed.

The above-mentioned load weight of the vehicle body may be set manually by the user and the load weight is obtained through obtaining the preset load weight corresponding to the manually selected gear position. In some embodiment, it may be detected automatically by a weight sensor provided on the seat.

In some embodiment, to obtain the load weight of the vehicle body, the power-assist control method for an intelligent rollator of the present application further includes the following steps to achieve intelligent detection of the load weight:

Obtaining at least one of the following parameters under the condition of the set speed:

The acceleration time of the intelligent rollator, the output power of the motor of the intelligent rollator and the current of the motor; and Obtaining the pre-set load weight corresponding to the at least one of the parameters as the current load weight of the vehicle body.

The above three determination methods for the load weight can be used independently or simultaneously in the intelligent rollator, and the user can choose one of the weight determination methods to use.

Preferably, the intelligent rollator can be driven by the set output torque of the motor and accelerate from the preset initial speed to the preset intermediate speed, then the acceleration time is recorded, and the power and current of the motor is collected when the intelligent rollator drives at the preset intermediate speed, thus the corresponding preset load weight can be obtained by means of a software look-up table in combination with the acceleration time.

Figure 3:
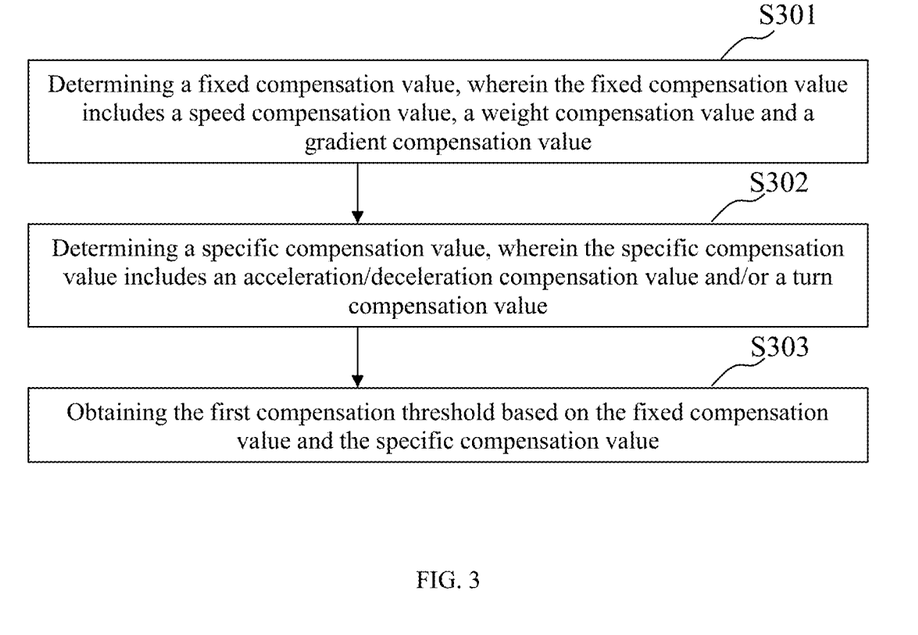
FIG. 3 is s a flow diagram of a power-assist control method for an intelligent rollator according to some embodiment of the present application.

Specifically, in some embodiment, the first compensation threshold consists of a fixed compensation value and a specific compensation value. As shown in FIG. 3, determination of the first compensation threshold includes the following steps:

S301: Determining a fixed compensation value, wherein the fixed compensation value includes a speed compensation value, a weight compensation value and a gradient compensation value;

S302: Determining a specific compensation value, wherein the specific compensation value includes an acceleration/deceleration compensation value and/or a turn compensation value; and S303: Obtaining the first compensation threshold based on the fixed compensation value and the specific compensation value.

For different operating conditions, the fixed compensation value and the specific compensation value can be positive, negative or zero. When the value is positive, it represents the forward power exerted by the driving motor; when the value is negative, it represents the backward resistance exerted by the driving motor, that is, the reverse braking force.

The first compensation threshold may be determined by the weighted sum of the fixed compensation value and the specific compensation value. In a preferred embodiment, the first compensation threshold value=the fixed compensation value+the specific compensation value.

Similarly, the fixed compensation value may be determined by the weighted sum of the speed compensation value, the weight compensation value and the gradient compensation value, while the specific compensation value may be any one of the acceleration/deceleration compensation value or the turn compensation value, or it is determined by the weighted sum of the acceleration/deceleration compensation value and the turn compensation value.

The speed compensation value can be determined according to the current moving speed of the intelligent rollator, the faster the moving speed, the greater the speed compensation value.

In a preferred embodiment, the steps of determining the speed compensation value include:
  obtaining the current moving speed of the intelligent rollator; and
  obtaining the power compensation coefficient currently required according to the moving speed through looking up a table, and obtaining the speed compensation value according to the moving speed and the power compensation coefficient, wherein the speed compensation value is direct proportional to the moving speed and the power compensation coefficient. Preferably, the speed compensation value=the moving speed multiplies the power compensation coefficient.

The weight compensation value can be determined according to the current load weight of the intelligent rollator, the larger the load, the larger the weight compensation value.

Regarding to the gradient compensation value, the steps of determining the gradient compensation value include:
  determining the gradient compensation value, when the intelligent rollator going uphill, the greater the gradient, the greater the gradient compensation value; and
  determining the gradient compensation value, when the intelligent rollator going downhill, the greater the gradient, the smaller the gradient compensation value which is negative.

That is, the larger the angle when going uphill, the greater the forward compensation power, which increases the forward power of the intelligent rollator to save effort for going uphill; the larger the angle when going downhill, the greater the reverse compensation power, which increases the reverse braking force to decrease the forward speed for going downhill safer.

Above uphill state or downhill state is obtained by detecting the attitude of the vehicle body with the attitude sensing component which is further provided on the vehicle body in FIG. 1. Preferably, the attitude sensing component includes acceleration sensor and angle sensor. According to the quaternion method solution and Euler's formula, the horizontal and vertical angles roll and pitch of the vehicle body can be obtained, as well as the rotation angular velocity of the two directions.

In order to have a smoother transition from flat to uphill, a smoother transition from downhill to flat, and a smoother transition in the case of potholes, in a preferred embodiment, the steps for determining the gradient compensation value further include:
  determining the vehicle body in a horizontal road when the absolute value of the vertical angle of the vehicle body is less than or equal to a set threshold (the set threshold is a positive number), to avoid misjudging a bumpy road as uphill or downhill;
  determining that the intelligent rollator is moving from flat to uphill and increasing gradually the gradient compensation value, when the vertical angle of the vehicle body is greater than a first set threshold (a positive number) and the angular velocity of the vehicle body in the vertical direction is greater than a second set threshold, to achieve a smooth uphill; and
  determining that the intelligent rollator is moving from downhill to flat and increasing gradually the gradient compensation value which is a negative value, when the vertical angle of the vehicle body is less than a third set threshold which is a negative number and the angular velocity of the vehicle body in the vertical direction is greater than a set fourth threshold, to achieve a gentle ending of downhill.

When pushing a traditional rollator, the faster the moving speed of the rollator, the more effort it takes, and in the process of speeding up, the force needed also increases. So when an intelligent rollator is in an acceleration stage, the power compensation may be increased accordingly, and when the intelligent rollator is in a deceleration stage, the braking force compensation may be activated to brake the rollator emergently to quickly reduce the speed of the rollator.

The acceleration/deceleration compensation value is used to determine the above user's intention, i.e., when the user's intention to change the motion state of the vehicle body is detected, such as start-stop, acceleration or deceleration, etc. In a preferred embodiment, the steps of determining the acceleration/deceleration compensation value include:
  obtaining the acceleration or deceleration of the forward movement of the intelligent rollator, wherein the acceleration indicates that the intelligent rollator is in an acceleration stage, and the deceleration indicates that the intelligent rollator is in a deceleration stage; determining that the acceleration/deceleration compensation value is a positive value and is direct proportional to the acceleration, when the intelligent rollator is in an acceleration stage; and
  determining that the acceleration/deceleration compensation value is a negative value and is direct proportional to the deceleration, when the intelligent rollator is in a deceleration stage. The acceleration of the forward movement of the intelligent rollator may be obtained by the acceleration sensor in the embodiment.

The turn compensation value is used for power compensation for changing the direction of the intelligent rollator. In FIG. 1, the left wheel and right wheel of the rear wheels are controlled by different motors, and the turn compensation value includes the left-wheel turn compensation value and the right-wheel turn compensation value, wherein the steps of determining the turn compensation value includes:
  increasing the left-wheel turn compensation value and/or decreasing the right-wheel turn compensation value, when the intelligent rollator makes a right turn; and
  increasing the right-wheel turn compensation value and/or decreasing the left-wheel turn compensation value, when the intelligent rollator makes a left turn.

Above turning state of the intelligent rollator may be obtained through the acceleration sensor of the accelerometer. In a preferred embodiment, the turning state of the intelligent rollator is obtained intelligently according to the obtained differential speed between the left wheel and the right wheel.

Preferably, when the left wheel turn compensation value is increased, the right wheel turn compensation value is decreased simultaneously, and when the right wheel turn compensation value is increased, the left wheel turn compensation value is decreased simultaneously. That is, the larger the turn angle is, the larger the assist compensation threshold of the outer wheel is, and the more the assist compensation threshold of the inner wheel is reduced, so that there is a differential speed between the two wheel motors to facilitate turning.

In some embodiment, when the intelligent rollator turns to the right, the left wheel turn compensation value is increased in direct proportion to the turn angle of the intelligent rollator, and preferably, the right wheel turn compensation value is decreased in direct proportion to the turn angle of the intelligent rollator simultaneously;

when the intelligent rollator turns to the left, the right wheel turn compensation value is increased in direct proportion to the turn angle of the intelligent rollator, and preferably, the left wheel turn compensation value is decreased in direct proportion to the turn angle of the intelligent rollator simultaneously.

The above turn compensation is only triggered when it is detected that the turning reaches a certain angle. In a preferred embodiment, the following steps are further included:

obtaining the moving speeds of the left wheel and the right wheel respectively; and triggering a turn determination of the intelligent rollator when the difference between the moving speeds of the left wheel and the right wheel exceeds a set differential speed threshold.

That is, the turn angle is intelligently detected by the differential speed between the left wheel and the right wheel.

Figure 4:
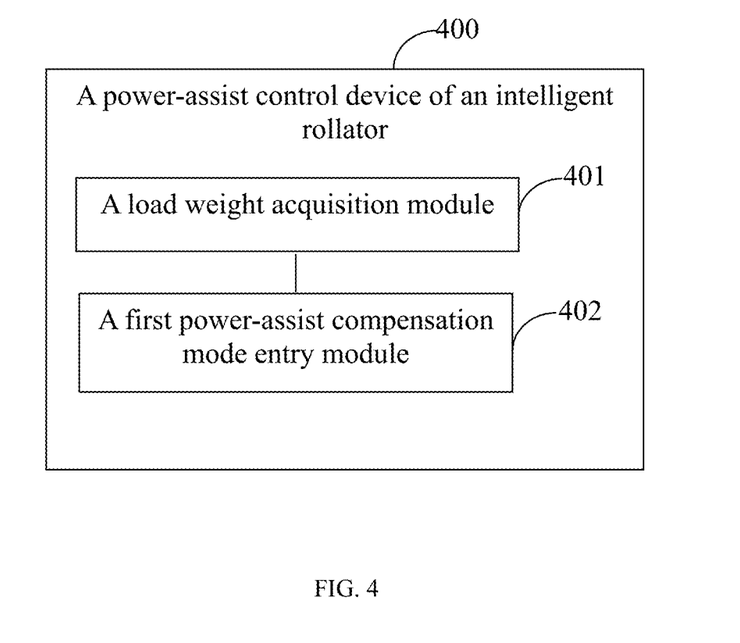
FIG. 4 is a schematic structural view of a power-assist control device of an intelligent rollator according to some embodiment of the present application.

In accordance with the above-mentioned power-assist control method for an intelligent rollator, some embodiment of the present application further provides a power-assist control device 400 of an intelligent rollator as shown in FIG. 4, which includes:

a load weight acquisition module 401 for obtaining the load weight of the vehicle body; and a first power-assist compensation mode entry module 402 for entering a first power-assist compensation mode to compensate the torque output of the motor according to a first power-assist compensation threshold, when the load weight is greater than a set threshold, wherein the first power-assist compensation threshold is direct proportional to at least one of the following parameters: the load weight of the vehicle body, and the moving speed of the intelligent rollator.

In some embodiment, the load weight acquisition module 401 includes:

a load setting unit for obtaining the load weight of the vehicle body through obtaining the preset load weight corresponding to the manually selected gear position; and/or a load automatic acquisition unit for automatically obtaining the load weight of the vehicle body, including:

a first parameter acquisition subunit for obtaining at least one of the following parameters under the condition of the set speed:

the acceleration time of the intelligent rollator, the output power of the motor of the intelligent rollator and the current of the motor; and a load acquisition subunit for obtaining the pre-set load weight corresponding to the at least one of the parameters as the current load weight of the vehicle body.

In some embodiment, the device further includes:

a second power-assist compensation mode entry module for entering a second power-assist compensation mode to compensate the torque output of the motor according to a second power-assist compensation threshold, when the load weight is less than a set threshold, wherein the second power-assist compensation threshold is obtained according to a set gear.

In some embodiment, the device further includes a first compensation threshold determination module, including:

a fixed compensation determination unit for determining a fixed compensation value, wherein the fixed compensation value includes a speed compensation value, a weight compensation value and a gradient compensation value;

a specific compensation determination unit for determining a specific compensation value, wherein the specific compensation value includes an acceleration/deceleration compensation value and/or a turn compensation value; and a first compensation threshold determination unit for obtaining the first compensation threshold based on the fixed compensation value and the specific compensation value.

In some embodiment, the fixed compensation determination unit includes:

a moving speed acquisition subunit for obtaining the current moving speed of the intelligent rollator; and a speed compensation acquisition subunit for obtaining the power compensation coefficient currently required according to the moving speed through looking up a table, and obtaining the speed compensation value according to the moving speed and the power compensation coefficient, wherein the speed compensation value is direct proportional to the moving speed and the power compensation coefficient.

In some embodiment, the fixed compensation determination unit includes:

a first gradient compensation subunit for determining the gradient compensation value, when the intelligent rollator going uphill, the greater the gradient, the greater the gradient compensation value; and a second gradient compensation subunit for determining the gradient compensation value, when the intelligent rollator going downhill, the greater the gradient, the smaller the gradient compensation value which is negative.

In some embodiment, the fixed compensation determination unit further includes:

a third gradient compensation subunit for determining that the intelligent rollator is moving from flat to uphill and increasing gradually the gradient compensation value, when the vertical angle of the vehicle body is greater than a first set threshold and the angular velocity of the vehicle body in the vertical direction is greater than a second set threshold; and a forth gradient compensation subunit for determining that the intelligent rollator is moving from downhill to flat and increasing gradually the gradient compensation value which is a negative value, when the vertical angle of the vehicle body is less than a third set threshold which is a negative number and the angular velocity of the vehicle body in the vertical direction is greater than a set fourth threshold In some embodiment, the specific compensation determination unit includes:
a first acceleration acquisition subunit for obtaining the acceleration or deceleration of the forward movement of the intelligent rollator, wherein the acceleration indicates that the intelligent rollator is in an acceleration stage, and the deceleration indicates that the intelligent rollator is in a deceleration stage;
a second acceleration acquisition subunit for determining that the acceleration/deceleration compensation value is a positive value and is direct proportional to the acceleration, when the intelligent rollator is in an acceleration stage; and
a third acceleration acquisition subunit for determining that the acceleration/deceleration compensation value is a negative value and is direct proportional to the deceleration, when the intelligent rollator is in a deceleration stage.

In some embodiment, the front wheel or the rear wheel includes a left wheel and a right wheel which are controlled by different motors respectively, and the turn compensation value includes a left-wheel turn compensation value and a right-wheel turn compensation value, wherein the specific compensation determination unit includes:
a first turn compensation unit for increasing the left-wheel turn compensation value and/or decreasing the right-wheel turn compensation value, when the intelligent rollator makes a right turn; and
a second turn compensation unit for increasing the right-wheel turn compensation value and/or decreasing the left-wheel turn compensation value, when the intelligent rollator makes a left turn.

In some embodiment, the specific compensation determination unit further includes:
a third turn compensation unit for increasing the left wheel turn compensation value and/or decreasing the right wheel turn compensation value in direct proportion to the turn angle of the intelligent rollator, when the intelligent rollator turns to the right; and
a forth turn compensation unit for increasing the right wheel turn compensation value and/or decreasing the left wheel turn compensation value in direct proportion to the turn angle of the intelligent rollator, when the intelligent rollator turns to the left.

In some embodiment, the specific compensation determination unit further includes:
a left and right wheel moving speed acquisition subunit for obtaining the moving speeds of the left wheel and the right wheel respectively; and
a turn determination trigger subunit for triggering a turn determination of the intelligent rollator when the difference between the moving speeds of the left wheel and the right wheel exceeds a set differential speed threshold.

In accordance with the above-mentioned power-assist control method for an intelligent rollator, some embodiment of the present application further provides an intelligent rollator, which includes:
at least one memory and at least one processor;
one or more programs stored in the memory,
wherein the one or more programs are executed by the at least one processor to implement the steps of a power-assist control method for an intelligent rollator according to any one of the above embodiments.

In accordance with the above-mentioned power-assist control method for an intelligent rollator, some embodiment of the present application further provides a controller, which includes:
at least one memory and at least one processor;
one or more programs stored in the memory,
wherein the one or more programs are executed by the at least one processor to implement the steps of a power-assist control method for an intelligent rollator according to any one of the above embodiments.

Embodiments of the present application can automatically determine whether the intelligent rollator is used to seat a person or place objects according to the load weight of the intelligent rollator, so as to automatically select a first power-assist compensation mode (wheelchair mode) or a second power-assist compensation mode (shopping stroller mode), and automatically adjust the power-assist compensation threshold according to the difference of the two power-assist compensation modes, making the intelligent rollator of the present application more intelligent. And further, in the first power-assist compensation mode, the gradient compensation, the speed compensation, the acceleration/deceleration compensation and the turn compensation are applied to the intelligent rollator, to realize the intended smooth walking of the user in any road conditions.

While the present application has been described in conjunction with the specific embodiments outlined above, it is evident that many alternatives, modifications and variations will be apparent to those skilled in the art.

Accordingly, the preferred embodiments of the present application as set forth above are intended to be illustrative, not limiting. It will be appreciated by persons skilled in the art that various changes may be made without departing from the spirit and scope of the invention, as required by the following claims. The claims provide the scope of the coverage of the application and should not be limited to the specific examples provided herein.

What is claimed:

1. A power-assist control method for an intelligent rollator having a vehicle body, a seat provided in the vehicle body for a person to sit or place items on, and front and rear wheels provided at the bottom of the vehicle body, driven by motors, the motors are controlled via a control device based on the power-assist control method, wherein the method comprises the following steps:
obtaining a load weight of the vehicle body, comprising:
obtaining a preset load weight corresponding to a manually selected gear position as the load weight of the vehicle body;
and/or
obtaining the load weight of the vehicle body automatically, comprising:
obtaining at least one of the following parameters under the condition of the set speed:
the acceleration time of the intelligent rollator, the output power of the motor of the intelligent rollator and the current of the motor; and
obtaining a pre-set load weight corresponding to the at least one of the parameters as the current load weight of the vehicle body; and
entering a first power-assist compensation mode to compensate the torque output of the motor according to a first power-assist compensation threshold, when the load weight is greater than a set threshold, wherein the first power-assist compensation threshold is direct proportional to at least one of the following parameters:

the load weight of the vehicle body, and the moving speed of the intelligent rollator;

wherein determination of the first power-assist compensation threshold comprises the following steps:

determining a fixed compensation value, wherein the fixed compensation value includes a speed compensation value, a weight compensation value and a gradient compensation value;

determining a specific compensation value, wherein the specific compensation value includes an acceleration/deceleration compensation value and/or a turn compensation value; and obtaining the first power-assist compensation threshold based on the fixed compensation value and the specific compensation value.

2. The power-assist control method of claim 1, wherein further comprising the following step:

entering a second power-assist compensation mode to compensate the torque output of the motor according to a second power-assist compensation threshold, when the load weight is less than a set threshold, wherein the second power-assist compensation threshold is obtained according to a set gear.

3. The power-assist control method of claim 1, wherein determining the speed compensation value comprises the following steps:

obtaining the current moving speed of the intelligent rollator; and obtaining a power compensation coefficient currently required according to the moving speed, and obtaining the speed compensation value according to the moving speed and the power compensation coefficient, wherein the speed compensation value is direct proportional to the moving speed and the power compensation coefficient.

4. The power-assist control method of claim 3, wherein determining the gradient compensation value further comprising the following steps:

determining that the intelligent rollator is moving from flat to uphill and increasing gradually the gradient compensation value, when the vertical angle of the vehicle body is greater than a first set threshold and the angular velocity of the vehicle body in the vertical direction is greater than a second set threshold; and determining that the intelligent rollator is moving from downhill to flat and increasing gradually the gradient compensation value which is a negative value, when the vertical angle of the vehicle body is less than a third set threshold which is negative and the angular velocity of the vehicle body in the vertical direction is greater than a set fourth threshold.

5. The power-assist control method of claim 4, further comprising the following steps:

increasing the left wheel turn compensation value and/or decreasing the right wheel turn compensation value in proportion to the turn angle of the intelligent rollator, when the intelligent rollator turns to the right; and increasing the right wheel turn compensation value and/or decreasing the left wheel turn compensation value in proportion to the turn angle of the intelligent rollator, when the intelligent rollator turns to the left.

6. The power-assist control method of claim 1, wherein determining the gradient compensation value comprises the following steps:

determining the gradient compensation value, when the intelligent rollator going uphill, the greater the gradient, the greater the gradient compensation value; and determining the gradient compensation value, when the intelligent rollator going downhill, the greater the gradient, the smaller the gradient compensation value which is negative.

7. The power-assist control method of claim 1, wherein the front wheel or the rear wheel comprises a left wheel and a right wheel which are controlled by different motors respectively, the turn compensation value comprises a left-wheel turn compensation value and a right-wheel turn compensation value, and the steps of determining the turn compensation value comprises:

increasing the left-wheel turn compensation value and/or decreasing the right-wheel turn compensation value, when the intelligent rollator makes a right turn; and increasing the right-wheel turn compensation value and/or decreasing the left-wheel turn compensation value, when the intelligent rollator makes a left turn.

8. An intelligent rollator, comprising:

at least one memory and at least one processor;

one or more programs stored in the memory, wherein the one or more programs are executed by the at least one processor to implement the steps of a power-assist control method for an intelligent rollator according to claim 1.

9. A controller, comprising:

at least one memory and at least one processor;

one or more programs stored in the memory, wherein the one or more programs are executed by the at least one processor to implement the steps of a power-assist control method for an intelligent rollator according to claim 1.

10. The power-assist control method of claim 1, wherein determining the acceleration/deceleration compensation value comprises the following steps:

obtaining the acceleration or deceleration of the forward movement of the intelligent rollator, wherein the acceleration indicates that the intelligent rollator is in an acceleration stage, and the deceleration indicates that the intelligent rollator is in a deceleration stage;

determining that the acceleration/deceleration compensation value is a positive value and is direct proportional to the acceleration, when the intelligent rollator is in an acceleration stage; and determining that the acceleration/deceleration compensation value is a negative value and is direct proportional to the deceleration, when the intelligent rollator is in a deceleration stage.

11. The power-assist control method of claim 10, wherein further comprising the following steps:

obtaining the moving speeds of the left wheel and the right wheel respectively; and triggering a turn determination of the intelligent rollator when the difference between the moving speeds of the left wheel and the right wheel exceeds a set differential speed threshold.

12. A power-assist control device for an intelligent rollator having a vehicle body, a seat provided in the vehicle body for a person to sit or place items on, and front and rear wheels provided at the bottom of the vehicle body, driven by motors, the power-assist control device controls the motors, wherein the device comprises:

a load weight acquisition module for obtaining a load weight of the vehicle body, comprises a first parameter acquisition subunit for obtaining at least one of the following parameters under the condition of the set speed: the acceleration time of the intelligent rollator, the output power of the motor of the intelligent rollator and the current of the motor;

a load acquisition subunit for obtaining a pre-set load weight corresponding to the at least one of the parameters as the current load weight of the vehicle body; and a first power-assist compensation mode entry module for entering a first power-assist compensation mode to compensate the torque output of the motor according to a first power-assist compensation threshold, when the load weight is greater than a set threshold, wherein the first power-assist compensation threshold is direct proportional to at least one of the following parameters: the load weight of the vehicle body, and the moving speed of the intelligent rollator; and a first power-assist compensation threshold determination module, comprising:

a fixed compensation determination unit for determining a fixed compensation value, wherein the fixed compensation value includes a speed compensation value, a weight compensation value and a gradient compensation value;

a specific compensation determination unit for determining a specific compensation value, wherein the specific compensation value includes an acceleration/deceleration compensation value and/or a turn compensation value; and a first compensation threshold determination unit for obtaining the first power-assist compensation threshold based on the fixed compensation value and the specific compensation value.

\* \* \* \* \*